J. C. Smith,
Bridle,
Nº 2,510.
Patented Mar. 23, 1842.
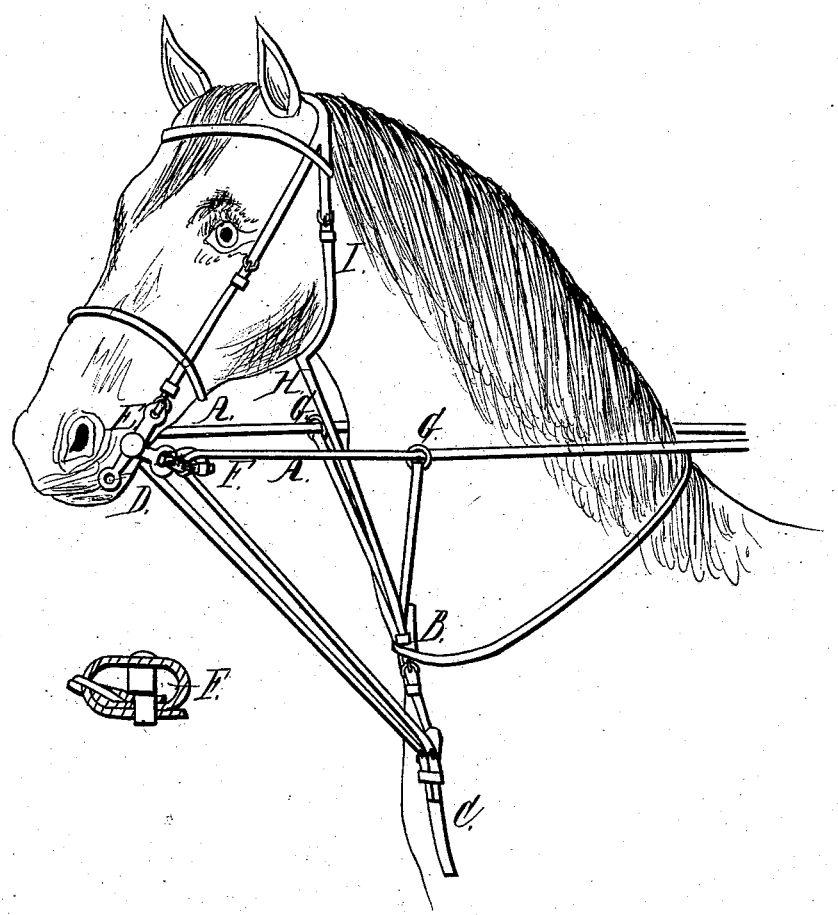

UNITED STATES PATENT OFFICE.

JNO. C. SMITH, OF BROOK HAVEN, NEW YORK.

CONSTRUCTION OF BRIDLES FOR HORSES.

Specification of Letters Patent No. 2,510, dated March 23, 1842.

*To all whom it may concern:*

Be it known that I, JOHN C. SMITH, of Brook Haven town, Suffolk county, State of New York, have invented a new and useful Improvement in the Construction of the Bridle for Horses, which is described as follows, reference being had to the annexed drawings of the same, making part of this specification.

This improvement consists in attaching the lower ends of the reins A to the martingale strap B at or near the chest C of the horse, instead of the rings D of the bit E and passing the other ends upward and through or over pulleys F attached to the rings of the bit and thence back toward the breast of the animal and through the rings G of a common martingale and thence upward to the hands of the rider where the ends are brought together and secured. Also in attaching a strap H to the common martingale strap B at the breast of the horse and extending the same to the throat band I of the common head stall. The rest of the bridle is made in the usual manner.

The above described mode of attaching the reins to the breast band of the martingale and passing them over pulleys on the bit gives the rider great power and complete command over the horse with an exertion of much less power than in the use of the common bridle enabling the rider to hold the head of the animal more firm and steady and to place himself in the saddle in the most easy and graceful position for riding properly and in the most convenient position for using the spur or rowel gradually or suddenly against the sides of the animal as may be desired and also assisting the animal to carry his head more steadily and decreasing the liability of his falling on his knees in stumbling; and for training trotters and breaking young horses it is an admirable invention—for the latter use in confining the young horse more closely and enabling the rider to manage him effectually and with very little trouble.

Other advantages will arise from the use of this improved bridle which will be evident to the intelligent man.

The strap H extending from the martingale strap B to the throat band I prevents the horse from throwing his head upward and by means of a buckle enables the rider or driver to adjust the head of the animal to any agreeable position.

In applying the above described improvement to carriage or other harness the reins may be attached to the harness under the chest—to the breeching or to the saddle. And on the saddle horse they may be attached to the girth or saddle or other suitable place.

What I claim as my invention and which I desire to secure by Letters Patent is—

1. Attaching the lower ends of the reins to the martingale strap or other secure part of the harness near the fore part of the animal, and passing the other ends over pulleys attached to the rings of the bit, in the manner herein set forth, or any other mode, substantially the same.

2. Likewise attaching the strap H to the martingale and throat band to prevent the animal throwing up his head, as before described.

JOHN C. SMITH.

Witnesses:
 WM. P. ELIOT,
 EDW. MAHER.